(12) United States Patent
Yu

(10) Patent No.: US 11,098,765 B2
(45) Date of Patent: Aug. 24, 2021

(54) ELASTIC SHORT-PIN TYPE UNIVERSAL JOINT

(71) Applicant: RE-DAI Precision Tools Co., LTD., Taichung (TW)

(72) Inventor: Hsiang Chen Yu, Taichung (TW)

(73) Assignee: RE-DAI Precision Tools Co., LTD., Taichung (TW)

( * ) Notice: Subject to any disclaimer, the term of this patent is extended or adjusted under 35 U.S.C. 154(b) by 660 days.

(21) Appl. No.: 15/928,131

(22) Filed: Mar. 22, 2018

(65) Prior Publication Data

US 2018/0209483 A1 Jul. 26, 2018

Related U.S. Application Data

(63) Continuation-in-part of application No. 14/554,138, filed on Nov. 26, 2014, now abandoned.

(51) Int. Cl.
| | |
|---|---|
| *F16D 3/205* | (2006.01) |
| *F16D 3/40* | (2006.01) |
| *B25B 23/00* | (2006.01) |
| *B25B 13/06* | (2006.01) |

(52) U.S. Cl.
CPC ............ *F16D 3/2057* (2013.01); *B25B 13/06* (2013.01); *B25B 23/0014* (2013.01); *F16D 3/40* (2013.01)

(58) Field of Classification Search
CPC ... B25B 23/0014; B25B 23/0028; F16D 3/28; F16D 3/38; F16D 3/40; Y10T 403/32041
USPC .................. 81/177.75; 403/57; 464/121, 136
See application file for complete search history.

(56) References Cited

U.S. PATENT DOCUMENTS

| | | | | |
|---|---|---|---|---|
| 719,411 | A * | 1/1903 | Bocorselski | F16D 3/40 464/134 |
| 927,087 | A * | 7/1909 | Vanderbeek | F16D 3/40 464/134 |
| 1,167,455 | A * | 1/1916 | Watts | F16D 3/40 464/132 |
| 1,364,842 | A * | 1/1921 | Mackey | F16D 3/2052 464/122 |
| 1,371,750 | A * | 3/1921 | Fox | F16D 3/40 464/134 |

(Continued)

FOREIGN PATENT DOCUMENTS

| | | |
|---|---|---|
| CN | 201068937 Y | 6/2008 |
| CN | 201425063 Y | 3/2010 |

(Continued)

*Primary Examiner* — Amber R Anderson
*Assistant Examiner* — Alexus Camero
(74) *Attorney, Agent, or Firm* — Alan D. Kamrath; Karin L. Williams; Mayer & Williams PC

(57) ABSTRACT

An elastic short-pin type universal joint includes a first base, a second base, a jointer, a first elastic member, two second elastic members, and four short pins. The first base engages the second base to form a space therebetween. The jointer is received in the space between the first and the second bases. The jointer has a first bore passing through the jointer, a second bore, and a third bore. The first elastic member is received in the first bore of the jointer, and the second elastic members are received in the second bore and the third bore. The short pins are urged by ends of the first elastic member and the second elastic members to press the first base and the second base respectively. As a result, the first base is able to rotate related to the second base in all directions.

3 Claims, 5 Drawing Sheets

(56) References Cited

U.S. PATENT DOCUMENTS

| | | | |
|---|---|---|---|
| 1,582,997 A | 5/1926 | McGee | |
| 1,887,106 A * | 11/1932 | Shierk | F16D 3/2052 |
| | | | 464/120 |
| 1,897,945 A | 2/1933 | Dooley | |
| 1,942,746 A | 1/1934 | Degener | |
| 1,978,590 A * | 10/1934 | McNaught | B25B 23/0014 |
| | | | 464/119 |
| 2,196,297 A * | 4/1940 | Gagne | F16D 3/38 |
| | | | 464/119 |
| 2,354,961 A | 8/1944 | O'Donnell | |
| 2,526,105 A * | 10/1950 | Adams | F16D 3/207 |
| | | | 464/115 |
| 2,648,207 A * | 8/1953 | Quinn | F16D 3/40 |
| | | | 464/136 |
| 2,696,124 A * | 12/1954 | Flowers | F16D 3/06 |
| | | | 74/325 |
| 2,800,777 A | 7/1957 | Baker et al. | |
| 2,844,949 A * | 7/1958 | Stillwagon, Jr. | F16D 3/40 |
| | | | 464/136 |
| 2,873,591 A | 2/1959 | Stillwagon, Jr. | |
| 2,881,602 A * | 4/1959 | Baker | E03B 9/02 |
| | | | 464/35 |
| 2,926,510 A | 3/1960 | De Lorean | |
| 2,947,158 A | 8/1960 | King | |
| 3,022,649 A | 2/1962 | Roller | |
| 3,213,644 A * | 10/1965 | Murphy | F16D 3/40 |
| | | | 464/11 |
| 3,310,959 A | 3/1967 | Sheppard | |
| 3,750,424 A * | 8/1973 | Nettleton | F16D 1/101 |
| | | | 464/102 |
| 3,930,378 A | 1/1976 | Schmid | |
| 4,365,488 A * | 12/1982 | Mochida | F16D 3/38 |
| | | | 403/57 |
| 4,786,271 A * | 11/1988 | Menn | F16D 3/36 |
| | | | 464/139 |
| 5,326,322 A * | 7/1994 | Fechter | F16D 3/38 |
| | | | 464/11 |
| 5,421,780 A * | 6/1995 | Vukovic | E21B 17/02 |
| | | | 464/102 |
| 5,505,661 A | 4/1996 | Habicht | |
| 5,660,491 A | 8/1997 | Roberts et al. | |
| 5,728,004 A * | 3/1998 | Dziegielewski | B62D 1/16 |
| | | | 464/70 |
| 6,162,126 A * | 12/2000 | Barrett | F16D 3/385 |
| | | | 464/134 |
| 6,383,081 B1 * | 5/2002 | DeBisschop | F16D 3/40 |
| | | | 464/114 |
| 6,656,053 B2 | 12/2003 | Chang | |
| 6,843,579 B2 | 1/2005 | Chen | |
| 6,874,392 B1 * | 4/2005 | Wu | B25B 23/0021 |
| | | | 81/177.2 |
| 6,881,151 B1 * | 4/2005 | Jantz | F16D 3/40 |
| | | | 464/14 |
| 6,976,922 B2 * | 12/2005 | Smith | F16D 3/38 |
| | | | 464/128 |
| 7,320,644 B2 | 1/2008 | Wehner | |
| 7,445,556 B2 | 11/2008 | Wehner | |
| 7,604,544 B2 | 10/2009 | Wehner | |
| 7,827,670 B2 | 11/2010 | Wehner | |
| 8,047,103 B2 | 11/2011 | Davidson et al. | |
| 8,328,648 B2 | 12/2012 | Molinar et al. | |
| 8,500,565 B2 * | 8/2013 | Billman | F16D 3/382 |
| | | | 464/136 |
| 8,562,448 B2 | 10/2013 | Song | |
| 8,657,694 B2 * | 2/2014 | Horwath | F16D 3/382 |
| | | | 464/136 |
| 8,746,113 B2 | 6/2014 | Davidson et al. | |
| 2005/0022748 A1 * | 2/2005 | Gabriel | A01K 1/0356 |
| | | | 119/72.5 |
| 2008/0108446 A1 * | 5/2008 | Faude | F16D 3/40 |
| | | | 464/136 |
| 2009/0023504 A1 | 1/2009 | Hu | |
| 2009/0036222 A1 | 2/2009 | Hu | |
| 2009/0041535 A1 * | 2/2009 | Hu | F16D 3/40 |
| | | | 403/57 |

FOREIGN PATENT DOCUMENTS

| | | | |
|---|---|---|---|
| GB | 1127196 A * | 9/1968 | G09B 9/04 |
| JP | 09317785 A * | 12/1997 | F16D 3/40 |
| TW | 244918 | 4/1995 | |
| TW | M252833 U | 12/2004 | |
| TW | M282072 U | 12/2005 | |
| TW | M431975 U | 6/2012 | |

* cited by examiner

ELASTIC SHORT-PIN TYPE UNIVERSAL JOINT

CROSS REFERENCE TO RELATED APPLICATIONS

This application is a Continuation-In-Part of U.S. patent application Ser. No. 14/554,138, filed Nov. 26, 2014, the entire disclosures of which is incorporated by reference herein for all purposes.

BACKGROUND OF THE INVENTION

1. Technical Field

The invention relates to the technical field of a universal joint, and more particularly to an elastic short-pin type universal joint structure using four elastic short pins connected to a first base, a second base and a connection member.

2. Description of Related Art

A typical universal joint comprises a first base (male base), a second base (female base), and a connection member disposed between the first base and the second base. More particularly, one long pin penetrates through the first base and the connection member, and the other long pin penetrates through the second base and the connection member.

Because two long pins are inserted into the connection member at different levels and the insertion directions of the two long pins are perpendicular to each other, the connection member has two through holes at different levels to be penetrated by the two long pins. For example, each of U.S. Pat. Nos. 8,746,113; 6,843,579; and 5,660,491 discloses the combination structure of the connection member and the two long pins.

The other relative prior arts include U.S. Pat. Nos. 1,897,945, 1,887,106, 1,602,997, and 4,786,271.

BRIEF SUMMARY OF THE INVENTION

In view of the above, the primary objective of the present invention is to provide an elastic short-pin type universal joint capable of reducing the overall size or length.

The secondary objective of the present invention is to provide an elastic short-pin type universal joint capable of making the overall assembling processes become simpler and more rapid.

The third objective of the present invention is to provide a positioning device of a tube flaring tool, which provides a stop plate to be removed and stored in an easy way.

In order to achieve the objective of the present invention, an elastic short-pin type universal joint includes a first base, a second base, a jointer, a first elastic member, two second elastic members, and four short pins. The first base has two first lugs, and the second base has two second lugs. The first base engages the second base with the first lugs between the second lugs. The jointer is received in a space within the first lugs and the second lugs. The jointer has a first bore passing through the jointer, a second bore, and a third bore. The first elastic member is received in the first bore of the jointer, and the second elastic members are received in the second bore and the third bore. The short pins are urged by ends of the first elastic member and the second elastic members to press the first lugs and the second lugs respectively.

In an embodiment, the second bore and the third bore are not communicated with the first bore. The second elastic members abut against bottoms of the second bore and the third bore.

In an embodiment, the second bore and the third bore are communicated with the first bore. The second elastic members abut against the first elastic member.

In an embodiment, the first elastic member has a foundation portion, which is a portion of the first elastic member harder than the other portion. The second elastic members abut against the foundation portion of the first elastic member.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
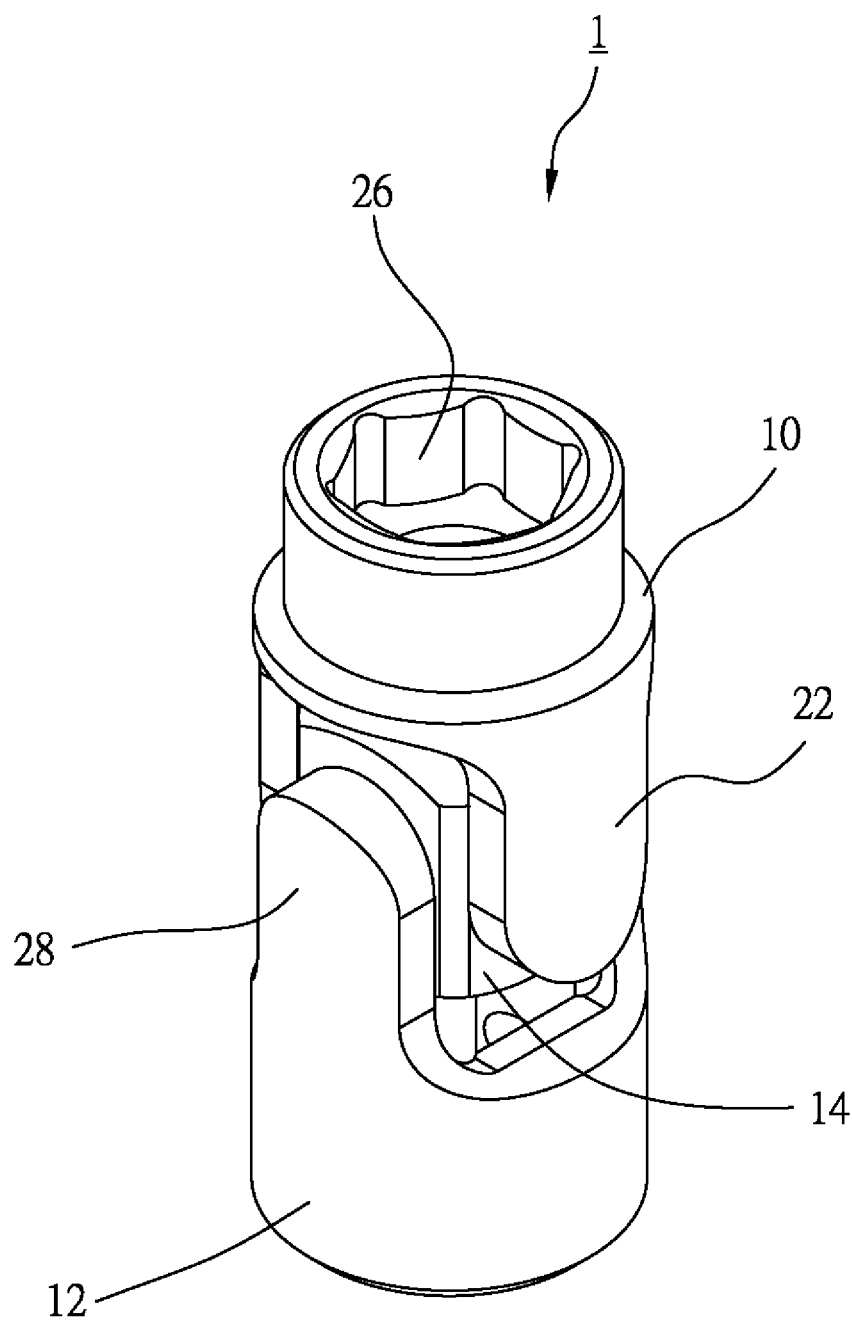
FIG. 1 is a perspective view of a first preferred embodiment of the present invention.
Figure 2:
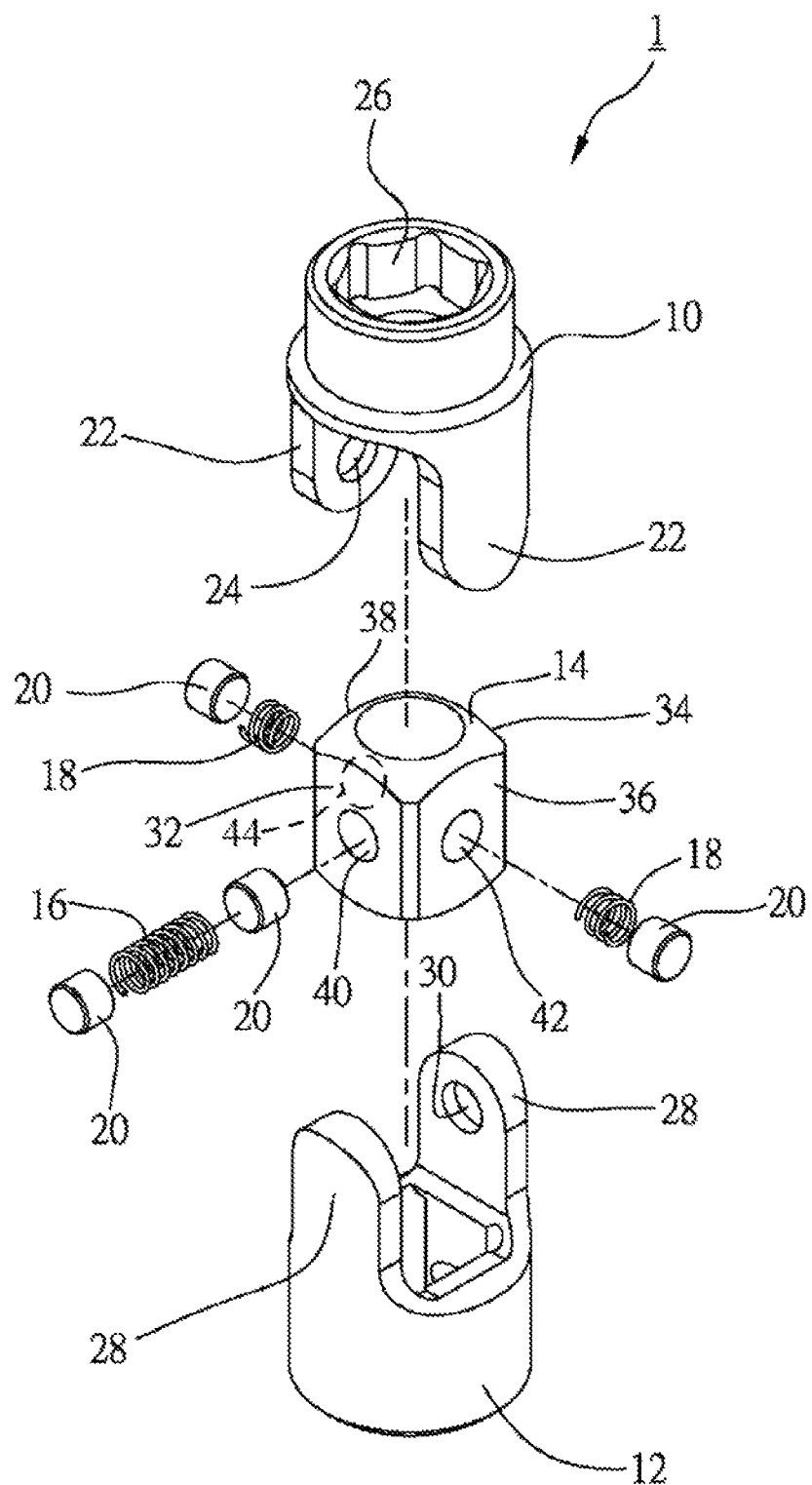
FIG. 2 is an exploded view of the first preferred embodiment of the present invention.

FIG. 1 and FIG. 2 show an elastic short-pin type universal joint 1 of the first preferred embodiment of the present invention, including a first base 10, a second base 12, a jointer 14, a first elastic member 16, two second elastic members 18, and four short pins 20.

The first base 10 has two first lugs 22. The first luges 22 are parallel to and kept a predetermined distance from each other. The first lugs 22 each have a recess 24 on interior sides thereof. The first base 10 further has a driving portion 26, which is a socket driver in the present preferred embodiment, at an end opposite to the first lugs 22.

The same as the first base 10, the second base 12 has two second lugs. The second lugs 28 are parallel and kept a predetermined distance from each other. The second lugs 28 each have a recess 30 on interior sides thereof.

The jointer 14 is a cub-like member, having a first side 32, a second side 34, a third side 36, and a fourth side 38, wherein the second side 34 is opposite to the first side 32, the third side 36 is next to the first side 32, and the fourth side 38 is opposite to the third side 36. The jointer 14 is provided with a first bore 40, a second bore 42 and a third bore 44. The first bore 40 passes through the jointer 14, and is opened at the first side 32 and the second side 34. The second bore 42 and the third bore 44 are at opposite sides of the first bore 40 while the second bore 42 is opened at the third side 36 and the third bore 44 is opened at the fourth side 38, and both of them are not communicated with the first bore 40.

The first elastic member 16 is a compression spiral springs in the present embodiment, which is received in the first bore 40 of the jointer 14. The second elastic members 18 are compression spiral springs as well and are shorter than the first elastic member 16. The second elastic members 18 are put in the second bore 42 and the third bore 44 of the jointer 14, respectively.

Figure 3:
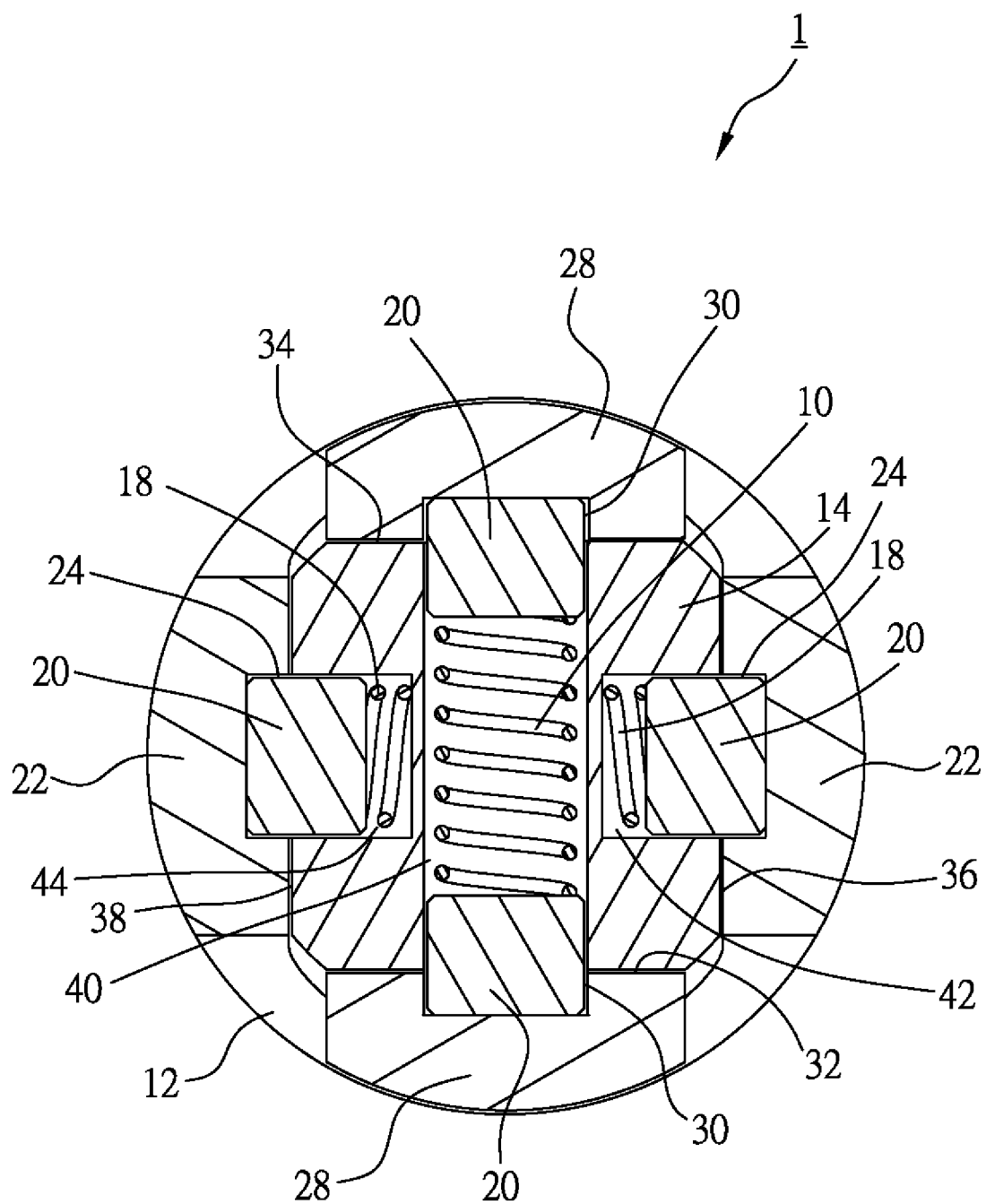
FIG. 3 is a sectional view of the first preferred embodiment of the present invention.

As shown in FIG. 3, the first base 10 engages the second base 12 with the first lugs 22 between the second lugs 28. The jointer 14 is received in a space within the first and the second lugs 22 and 28. The short pins 20 are received in the recesses 24 and 30 of the first and the second lugs 22 and 28, respectively, and the first and the second elastic members 16 and 18 have ends urging the short pins 20, respectively to make them abut against the first lugs 22 and the second lugs 28, respectively. Besides, each of the short pins 20 has a portion received in the first or the second or the third bore 40 or 42 or 44 and a portion received in the recess 24 or 30. As a result, the first base 10 is able to be rotated related to the second base 12 in all directions.

To compare with the prior arts, only three elastic members 16, 18 are provided in the first preferred embodiment, and the jointer 14 is drilled with three bores 40, 42, 44. It may reduce the cost and time to manufacture the elastic short-pin type universal joint 1 of the first preferred embodiment.

Figure 4:
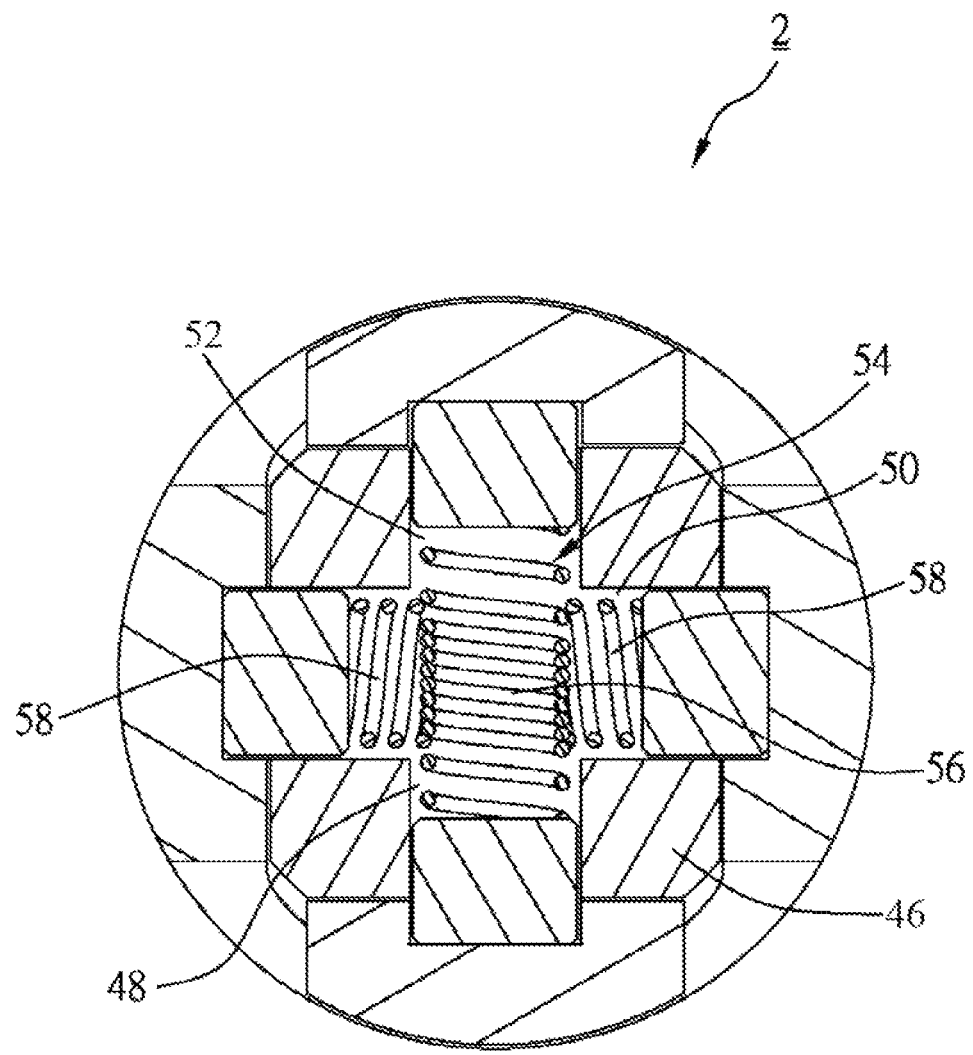
FIG. 4 is a sectional view of a second preferred embodiment of the present invention.
Figure 5:
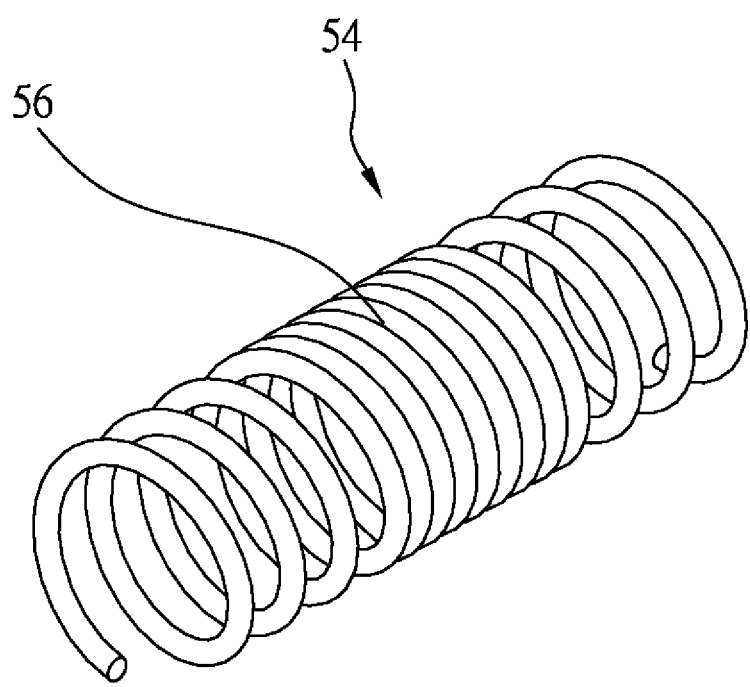
FIG. 5 is a perspective view of the first elastic member of the second preferred embodiment of the present invention.

As shown in FIG. 4 and FIG. 5, an elastic short-pin type universal joint 2 of the second preferred embodiment of the present invention are the same as the elastic short-pin type universal joint 1 of the first preferred embodiment, except that a jointer 46 is provided with a first bore 48, a second bore 50, and a third bore 52, and the second bore 50 and the third bore 52 are communicated with the first bore 48. A first elastic member 54 is a compression spiral spring in the second embodiment, having a foundation portion 56 at a middle portion thereof. A number of loops per unit length of the foundation portion 56 (or a density of the foundation portion 56) is greater than that of the other portions of the first elastic member 54, so that the foundation portion 56 is not easy to be deformed when it is exerted by an external force. The first elastic member 54 is received in the first bore 48 of the jointer 46. Two second elastic members 58 are put in the second bore 50 and the third bore 52, and have interior ends abutting against the foundation portion 56 of the first elastic member 54.

The function and operation of the elastic short-pin type universal joint 2 of the second preferred embodiment are the same as the first preferred embodiment, so we do not describe it again.

It must be pointed out that the embodiments described above are only some preferred embodiments of the present invention. All equivalent structures which employ the concepts disclosed in this specification and the appended claims should fall within the scope of the present invention.

What is claimed is:

1. An elastic short-pin type universal joint, comprising:
   a first base having two first lugs;
   a second base having two second lugs, wherein the first base engages the second base with the first lugs between the second lugs;
   a jointer having a first bore, a second bore, and a third bore; the first bore passing through the jointer, and the second bore and the third bore being at opposite sides of the first bore, wherein the jointer is received in a space within the first lugs of the first base and the second lugs of the second base;
   a first elastic member received in the first bore of the jointer;
   two second elastic members received in the second bore and the third bore; and
   four short pins received in the space within the first lugs of the first base and the second lugs of the second base, two of which are urged by opposite ends of the first elastic member and the other two of which are urged by the second elastic members, whereby the short pins abut against the first lugs of the first base and the second lugs of the second base by the first elastic member and the second elastic members,
   wherein the second bore and the third bore are communicated with the first bore, and the second elastic members abut against the first elastic member, and
   wherein the first elastic member has a foundation portion; a number of loops per unit length of the foundation portion is greater than the other portion of the first elastic member; and the second elastic members abut against the foundation portion of the first elastic member.

2. The elastic short-pin type universal joint of claim 1, wherein each of the first lugs of the first base and the second lugs of the second base has a recess on an interior side thereof, in which the short pins are received.

3. The elastic short-pin type universal joint of claim 1, wherein a density of the foundation portion is greater than the other portion of the first elastic member.

* * * * *